Figure 1:
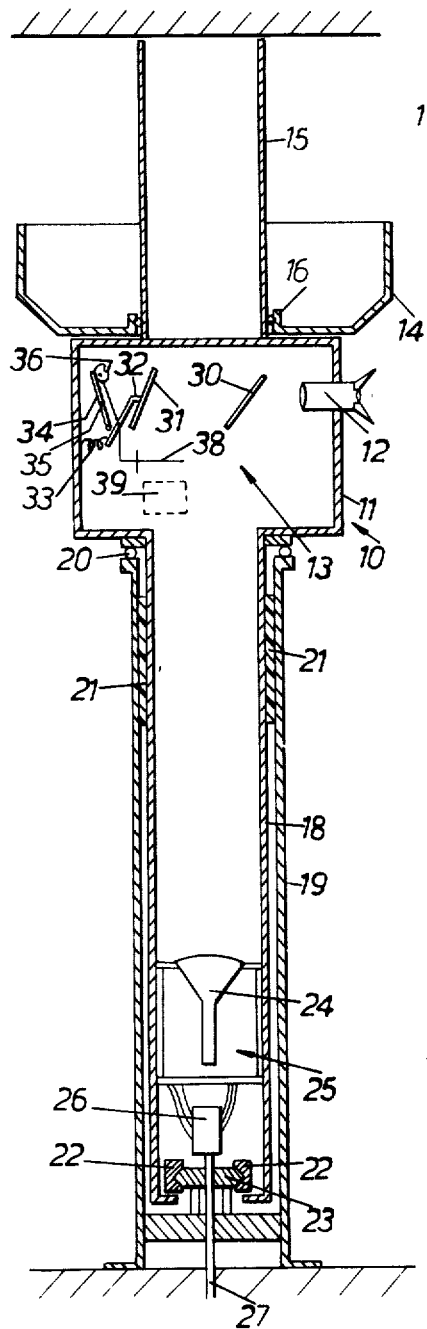

United States Patent [19]

Tickle

[11] 3,900,703
[45] Aug. 19, 1975

[54] TRAINING SIMULATORS FOR SUBMARINE PERISCOPES

[75] Inventor: John Edward Tickle, Heald Green, England

[73] Assignee: Ferranti Limited, Hollinwood, England

[22] Filed: Aug. 30, 1973

[21] Appl. No.: 392,926

[30] Foreign Application Priority Data

Aug. 30, 1972 United Kingdom............ 40165/72

[52] U.S. Cl. ............... 178/6; 178/6; 178/DIG. 20; 178/DIG. 35; 35/10.2; 35/12 N
[51] Int. Cl. ............................................. H04n 7/18
[58] Field of Search ........ 178/DIG. 35, DIG. 20, 6; 35/10.2, 12 N, 25; 350/301

[56] References Cited
UNITED STATES PATENTS

| | | | |
|---|---|---|---|
| 1,175,609 | 3/1916 | Cottrell | 114/16 C |
| 2,791,194 | 5/1957 | Janise | 114/16 C |
| 3,621,131 | 11/1971 | Wolff | 178/6.8 |
| 3,624,925 | 12/1971 | Herndom | 35/25 |

*Primary Examiner*—Robert L. Griffin
*Assistant Examiner*—Edward L. Coles
*Attorney, Agent, or Firm*—Cameron, Kerkam, Sutton, Stowell & Stowell

[57] ABSTRACT

A training simulator for a submarine periscope comprises an outwardly normal viewing station at eye-level mounted on a hollow support column from the floor. A hollow periscope tube, containing a television monitor, extends from the viewing station towards the floor within the support column. A false bulkhead and periscope tube extend to the ceiling of the room to complete the outward appearance of a periscope. The internal components of the viewing station are arranged so as to observe the screen of the television monitor, and the scene displayed thereon is shifted in accordance with rotation of the viewing station and operation of its controls.

12 Claims, 2 Drawing Figures

PATENTED AUG 19 1975  3,900,703

TRAINING SIMULATORS FOR SUBMARINE PERISCOPES

This invention relates to training simulators for submarine periscopes.

Training simulators for submarine periscopes have previously been constructed, using full-size or slightly shortened periscopes, which view a scene displayed on a cathode ray tube. Electronic means are employed to move the image on the tube in response to movements made by the periscope controls such that the observed scene behaves as it would under real operating conditions. While such training simulators are cheaper than employing a submarine for such purposes, they are still very expensive because of the expense involved in using a specially modified production model of a full-size periscope.

It is an object of the present invention to provide a training simulator for a submarine periscope that is of simple and novel construction.

According to the present invention a training simulator for a submarine periscope includes a viewing station containing optical focussing and range finding apparatus, a hollow periscope tube, in fixed relationship with, and extending from, the viewing station, a hollow support column extending between the floor and the viewing station and enclosing the periscope tube, bearing means, arranged to support the periscope tube within the support column, said bearing means being arranged to permit rotation of the viewing station and periscope tube about the longitudinal axis of the support column, and a television monitor located within the periscope tube and arranged to provide a scene for the viewing station.

Figure 2:
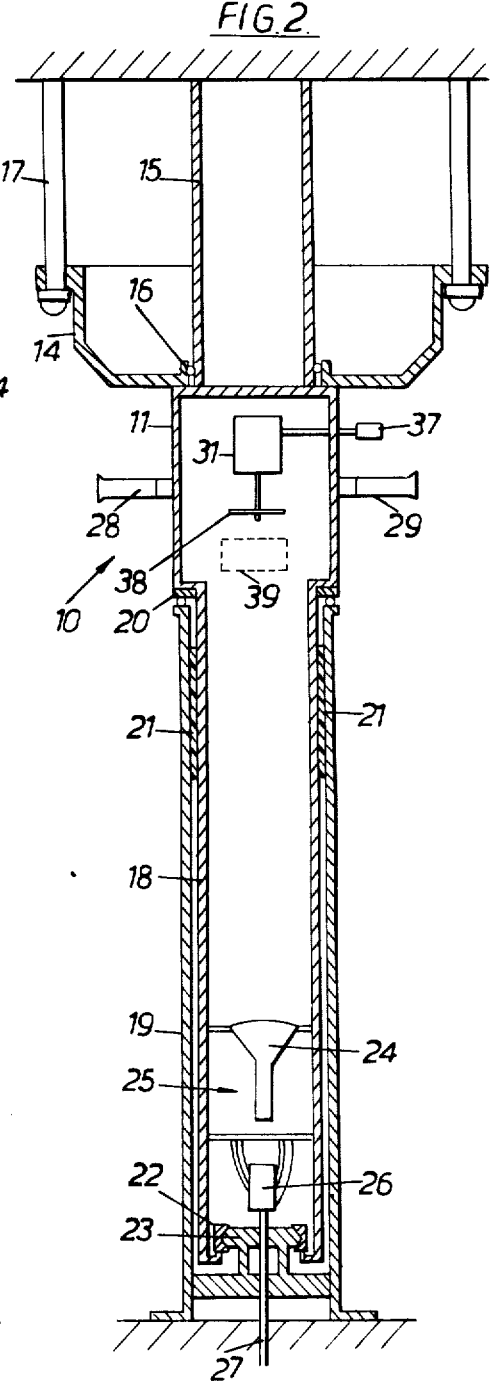

The invention will now be described by way of example with reference to the accompanying drawings, in which:

FIG. 1 is a sectional elevation through a simulated periscope according to the present invention, and FIG. 2 is a sectional elevation through the simulated periscope in a plane perpendicular to that of the elevation of FIG. 1.

Referring to FIGS. 1 and 2 the simulated periscope shown at 10 includes a viewing station 11 containing an adjustable focussing system 12 and range finding apparatus 13. Above the viewing station is an artificial bulkhead 14. A false periscope tube 15 extends from the viewing station through the bulkhead 14 to the ceiling of the room. A bearing 16 permits relative rotation between the tube and the bulkhead and the bulkhead is prevented from rotating by means of bars 17 extending from the ceiling. The bars 17 resemble those used to support the weight of a real periscope and are of large diameter but in the embodiment of the present invention suport support weight and merely prevent the above mentioned rotation of the bulkhead.

A hollow cylindrical periscope tube 18 extends downwards from the viewing station. The tube 18 is contained coaxially within a support column 19. The column 19 is fixed to the floor and extends to the base of the viewing station. A ring bearing 20 supports the viewing station and the attached periscope tube on the upper end of the column 19 and permits rotation of the station 11 and tube 18 about the longitudinal axis of the support column. A thrust bearing 21, of P.T.F.E., between the tube 18 and the column 19 prevents lateral movements of the periscope tube 18.

The overall length of the periscope tube has therefore been reduced from approximately 30 feet for a real periscope to approximately 7 feet and can be installed in a room of normal height. The weight of the periscope is consequently reduced and the inertia associated with rotating the large mass does not exist. A simulated inertia is provided in the form of frictional loading applied between one member 22, moved by the rotation of the periscope tube 18, and a further member 23 fixed in relation to the support column.

A seascape, which is to be observed by a trainee looking through the eye piece of the focussing system 12, is displayed on a cathode ray tube 24 which forms part of a television monitor 25 contained within the tube 18 and fixed in relation thereto. Power supplies and signals for the monitor and other controls which are able to rotate with the periscope tube are connected by way of a slip ring arrangement 26 to a cable 27 leading to the exterior of the periscope through the floor.

The scanning station has foldable handles 28 and 29 by which the periscope may be rotated. An angular position indicator (not shown) is connected to supply both the bearing reading of the periscope and to position the scene on the monitor in accordance with that bearing reading. A continuous rotation of the periscope results in a lateral shifting of the image. Rotation of handle 28 about its axis results in vertical shifting of the scene on the monitor. This response is equivalent to changing the angle of elevation of the sighting head on a real periscope.

Range finding is achieved by the apparatus 13, comprising a tilting mirror system, and is one of many variations on such systems. A first plane mirror 30 is half silvered, and fixed in position along the optical axis of the focussing system 12 so as to reflect the image of the scene on the monitor to the focussing system. A second plane mirror 31, also on the optical axis of the focussing system 12, but further away from it than the mirror 30, is rotatable about a horizontal axis so as to reflect the scene on the monitor to the focussing system by way of transmission through the mirror 30. The mirror 31 has a lever 32 attached to it and biased by spring 33 to rotate the mirror so that its reflected image of the monitor is directed away from the optical axis. A lever 34, pivoted about a horizontal axis 35 contacts the lever 32 by means of a roller at its lower end. The upper end of the lever 34 is contacted by the surface of a snail cam 36, which is rotatable about a horizontal axle and manually driven by knob 37. It will be appreciated that any rotation of the cam results in a corresponding rotation of the mirror 31.

A shutter 38 pivoted about a vertical axis is connected by way of a member 39 to the cam axle. The cam axle is adapted for axial movements whereby the shutter is caused to undergo rotation about its vertical axis.

For normal observations and sightings the shutter 38 is positioned so as to intercept the light between the monitor and the mirror 31 thereby permitting only the image reflected from the mirror 30 to be seen through focussing system 12.

When a ship is sighted and it is desired to determine its range, the cam 36 is moved axially to displace the shutter so that two superimposed images are visible. The cam is rotated until the waterline of the second image sits, say, on the top of the funnel of the first image. A potentiometer (not shown) attached to the cam axle produces a voltage proportional to the angle subtended at the periscope by the funnel of the target. The angle subtended is displayed on electrical meters (not shown) and, provided the height of the target ship funnel is known, the target's range can be calculated in a known manner. A further knob (not shown) on the periscope, also attached to a potentiometer, enables the target funnel height to be set into the instrument. This data, combined with the output of the 'angle subtended' potentiometer, is used in an electrical analogue calculator to produce a direct readout of range on an electrical meter.

Because of the relatively short distance between the focussing system 12 and the monitor 25, the difference in length between the optical paths of the scene between the two by way of mirrors 30 and 31 may result in the focussing system being unable to bring both images into focus during range finding. A block of glass or other transparent material 39, of the correct thickness, may be placed in the longer path below the shutter 38 such that the apparent position of the monitor 25, when viewed through the eyepiece, is closer to the mirror 31 by an amount equal to the difference between the optical path lengths.

Thus, the simulated periscope according to the present invention provides all the facilities of a real periscope but without the associated costly mechanical and housing arrangements. The only departure from the appearance of a real periscope is that there is no vertical movement of the periscope and that the space beneath the viewing station is occupied by the support column. This latter departure is not disadvantageous as the space below a periscope, usually a storage well, is railed off and therefore unusable.

What I claim is:

1. A training simulator for a submarine periscope located in a room having a floor and a ceiling and including a viewing station containing optical focussing and range finding apparatus, a hollow periscope tube in fixed relationship with, and extending downwardly from, the viewing station, a hollow support column fixed to the floor, extending between the floor and the viewing station and enclosing the periscope tube, bearing means arranged to support the periscope tube within the support column, said bearing means being arranged to permit rotation of the viewing station and periscope tube about the longitudinal axis of the support column, and a television monitor located within the periscope tube and arranged to provide a scene for the viewing station.

2. A training simulator as claimed in claim 1 in which the support column and periscope tube are coaxial cylinders.

3. A training simulator as claimed in claim 1 in which the bearing means includes an annular ring-bearing between an end face of the support column adjacent the viewing station and the base of the viewing station.

4. A training simulator as claimed in claim 3 in which the bearing means also includes a journal bearing between the periscope tube and the support column.

5. A training simulator as claimed in claim 1 in which there is further provided damping means against relative rotation between the periscope tube and the support column to simulate the inertial weight of a real periscope.

6. A training simulator as claimed in claim 5 in which the damping means comprises frictional engagement between two damping members, one of said members being fixed to the support column and the other of said members being movable by the periscope tube.

7. A training simulator as claimed in claim 6 in which said damping members are mounted adjacent the end of the periscope tube remote from the viewing station.

8. A training simulator as claimed in claim 1 in which the television monitor is located in the periscope tube as close as possible to the end of the tube remote from the viewing station.

9. A training simulator as claimed in claim 1 in which there is provided means responsive to rotation of the periscope tube within the support column to shift the scene on the television monitor laterally.

10. A training simulator as claimed in claim 1 including means to simulate tilting of a sighting head of a real periscope comprising means responsive to operation of tilt-control means to shift the scene on the television monitor vertically.

11. A training simulator as claimed in claim 1 wherein the range finding apparatus is of the type that combines light along two different paths and in which the relative difference in light path lengths is compensated for by means of a block of transparent material of suitable refractive index in one of the light paths.

12. A training simulator as claimed in claim 11 in which the transparent material comprises a block of glass placed in the longer light path.

* * * * *